United States Patent [19]
Ohata

[11] 4,426,923
[45] Jan. 24, 1984

[54] STORAGE DEVICE FOR PROCESSED FOODS

[76] Inventor: Takashi Ohata, No. 21-10, Tokiwadai 3-Chome, Itabashi-Ku, Tokyo, Japan

[21] Appl. No.: 424,152

[22] Filed: Sep. 27, 1982

[30] Foreign Application Priority Data

Jun. 18, 1982 [JP] Japan .......................... 57-90913[U]

[51] Int. Cl.³ .................. A23L 1/00; A21C 13/00; H05B 1/00
[52] U.S. Cl. ...................................... 99/468; 99/474; 99/483; 126/20; 126/21 A; 126/369; 219/400; 219/401; 426/418
[58] Field of Search ................ 99/447, 331, 332, 467, 99/468, 473, 474, 483, 486; 426/418, 419, 465, 506, 523; 219/362, 386, 400, 401, 408; 312/31, 236, 237; 126/348, 369, 20, 21 A

[56] References Cited
U.S. PATENT DOCUMENTS 3,518,949 7/1970 Stock ................................. 99/483 X
4,244,979 1/1981 Roderick ......................... 99/474 X

*Primary Examiner*—Timothy F. Simone
*Attorney, Agent, or Firm*—James E. Nilles

[57] ABSTRACT

A storage device for processed foods comprising a sealed storage chamber, an air passage provided in the storage chamber so as to extend along an inner surface thereof and having a suction port and a discharge port at upper and lower sections thereof, respectively, to permit the air to be circulated in the storage chamber, a fan provided in the air passage, an air heater provided in the storage chamber, a steam generator opened into the storage chamber, a temperature sensor and a humidity sensor provided in the storage chamber, and an electric circuit. The temperature in the storage chamber is regulated by the electric circuit to a predetermined level and thereby maintain the temperature therein substantially at a required level automatically. The humidity in the storage chamber is also regulated by the electric circuit to a predetermined level and thereby maintain the humidity therein substantially at a required level automatically.

6 Claims, 6 Drawing Figures

FIG. I
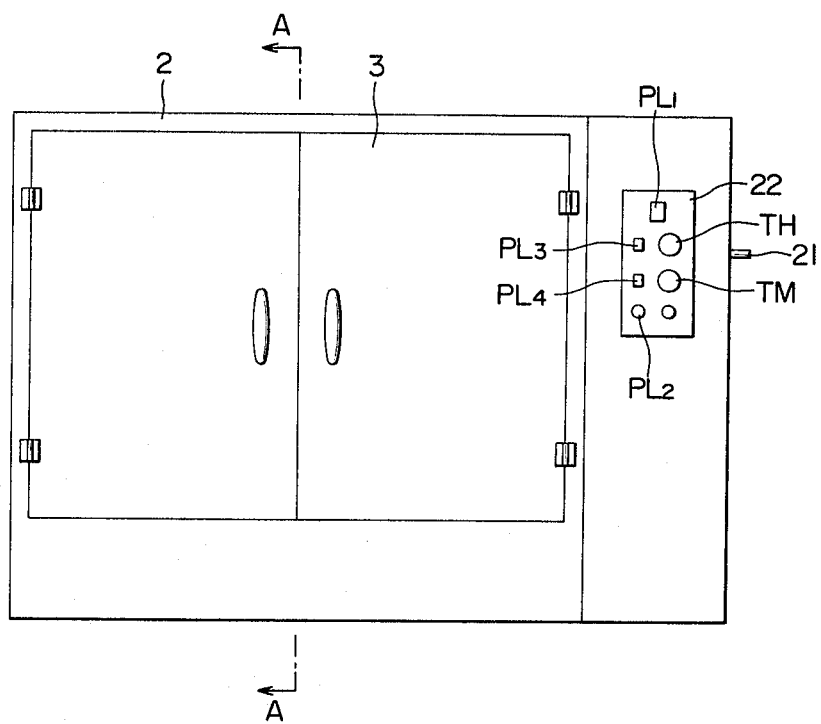
FIG. 2
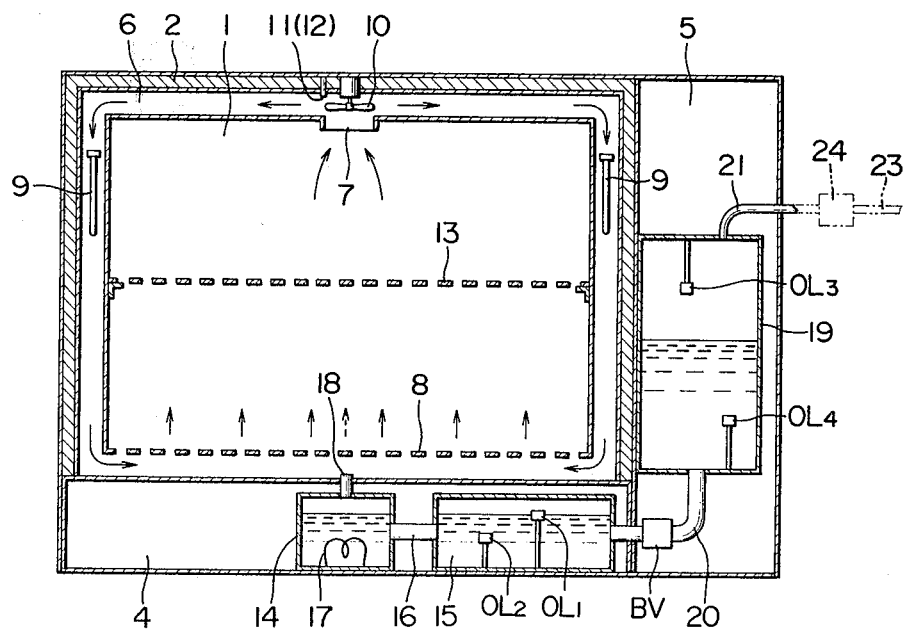

STORAGE DEVICE FOR PROCESSED FOODS

BACKGROUND OF THE INVENTION

1. Field of the Invention

This invention relates to a device for storing processed foods.

2. Description of the Prior Art

There is no satisfactory storage device for keeping in an unchanged condition for a long period of time processed foods, such as cooked rice, vegetables, fishes and meat, and broiled fishes. When the cooked rice in an electric rice cooker, which is adapted to serve also as a device for keeping the cooked rice hot, is left as it is in a heat-insulated state for around 12 hours, the color of the cooked rice is changed, and a bad smell occurs therein.

In an electric heat retaining storage device, only hot air is applied to the processed foods therein, so that the surfaces of the processed foods are dried and hardened. Consequently, the taste of the processed foods is spoiled. Therefore, such a heat retaining storage device is not suitably used to keep therein the processed foods as they are.

In fact, there is no satisfactory storage device for keeping cooked foods and broiled foods, such as broiled fishes while retaining the temperatures thereof.

SUMMARY OF THE INVENTION

An object of the present invention is to obtain a practically advantageous storage device for processed foods, which is free from the above-mentioned drawbacks encountered in a conventional storage device of this kind, and which permits controlling automatically the temperature and humidity of the air in the storage device to required levels in accordance with the kind and properties of the processed foods inserted therein, so as to keep the foods constantly in a balanced state at a temperature and humidity, at which the foods were processed, or so as to maintain the foods in a just-processed state for a long period of time without being spoiled and changed in quality.

BRIEF DESCRIPTION OF THE DRAWINGS

FIG. 1 is a front elevational view of a first embodiment of a storage device for processed foods according to the present invention;

FIG. 2 is a front elevational view in longitudinal section of the embodiment;

DESCRIPTION OF THE PREFERRED EMBODIMENTS

Figure 3:
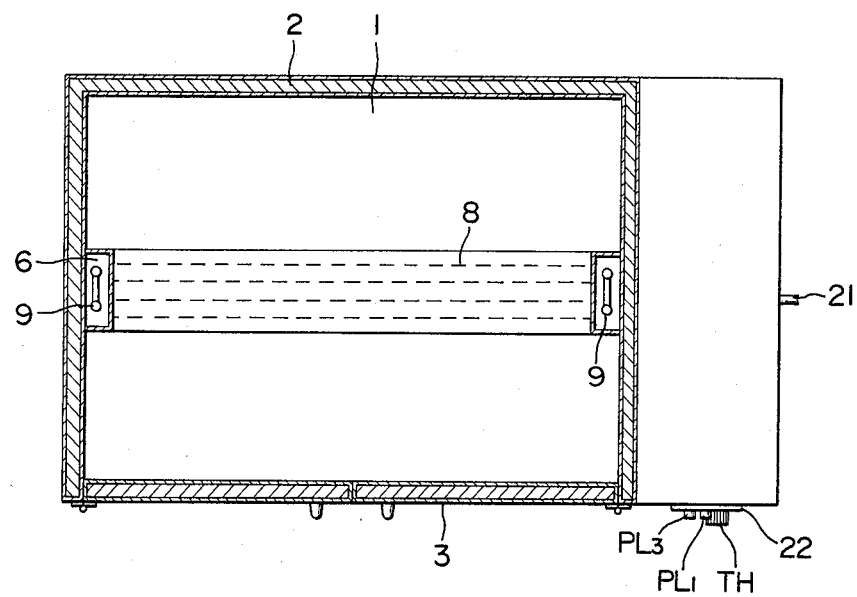
FIG. 3 is a plan view in section of the embodiment.
Figure 4:
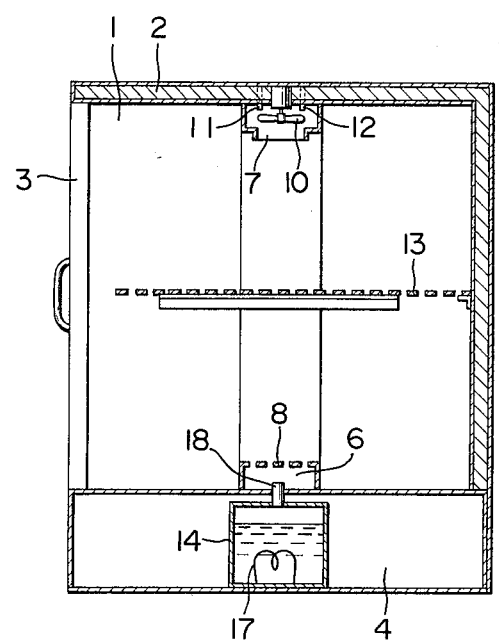
FIG. 4 is a sectional view taken along the line 4—4 in FIG. 1.

The construction of a first embodiment of the present invention will be described with reference to FIGS. 1-5. Reference numeral 1 denotes a storage chamber in a storage device for processed foods, and a wall 2 defining the storage chamber 1 consists of a heat insulating wall composed of inner and outer metal plates with a heat insulating material sandwiched therebetween. Double hinged doors 3, each of which consists of heat insulating plates formed in the same manner as the wall 2, are provided at a front opening of the storage chamber 1 so as to keep the chamber 1 in a sealed state. Tank-housing chambers 4, 5 are provided under and on one side of the storage chamber 1. Reference numeral 6 denotes an air passage extending along intermediate portions of the inner surfaces of both side and upper and lower portions of the wall 2. A suction port 7 is provided in the portion of the storage chamber 1 which corresponds to the central portion of a lower wall of an upper section of the air passage 6. A ventilating net 8 is provided in the portion of the storage chamber 1 which corresponds to an upper wall of a lower section of the air passage 6. Electric heaters 9 for use in heating the air are provided at upper portions of both side sections of the air passage 6, and a fan 10 in the portion of the air passage 6 which is faced to the suction port 7. A temperature sensor 11 and a humidity sensor 12 are provided in the portions of the air passage 6 which are in the vicinity of the fan 10. Reference numeral 13 denotes a shelf consisting of a ventilating net and detachably set in an intermediate portion of the interior of the storage chamber 1.

Reference numeral 14 denotes a steam generator provided in the central portion of the tank-housing chamber 4, and 15 a water tank set in one side portion of the same chamber 4. The steam generator 14 and water tank 15 are communicated with each other at intermediate portions thereof by means of a pipe 16. A heater 17 is provided in a bottom portion of the steam generator 14, and a steam discharge port 18 is opened into the air passage 6. The water tank 15 is provided therein with a totally-stopping float switch $OL_1$ and a water supply float switch $OL_2$. Reference numeral 19 denotes a spare tank installed in the tank-housing chamber 5 and communicated at a bottom portion thereof with the water tank 15 by means of a pipe 20, which is provided with an electromagnetic water supply valve BV. A water supply pipe 21 is opened at its end portion into an upper portion of the spare tank 19, which is provided therein with a float switch $OL_3$ adapted to be closed when the tank 19 is filled up with water, and a float switch $OL_4$ adapted to be opened for giving an alarm when the level of water in the tank 19 becomes lower than a predetermined level.

Figure 5:
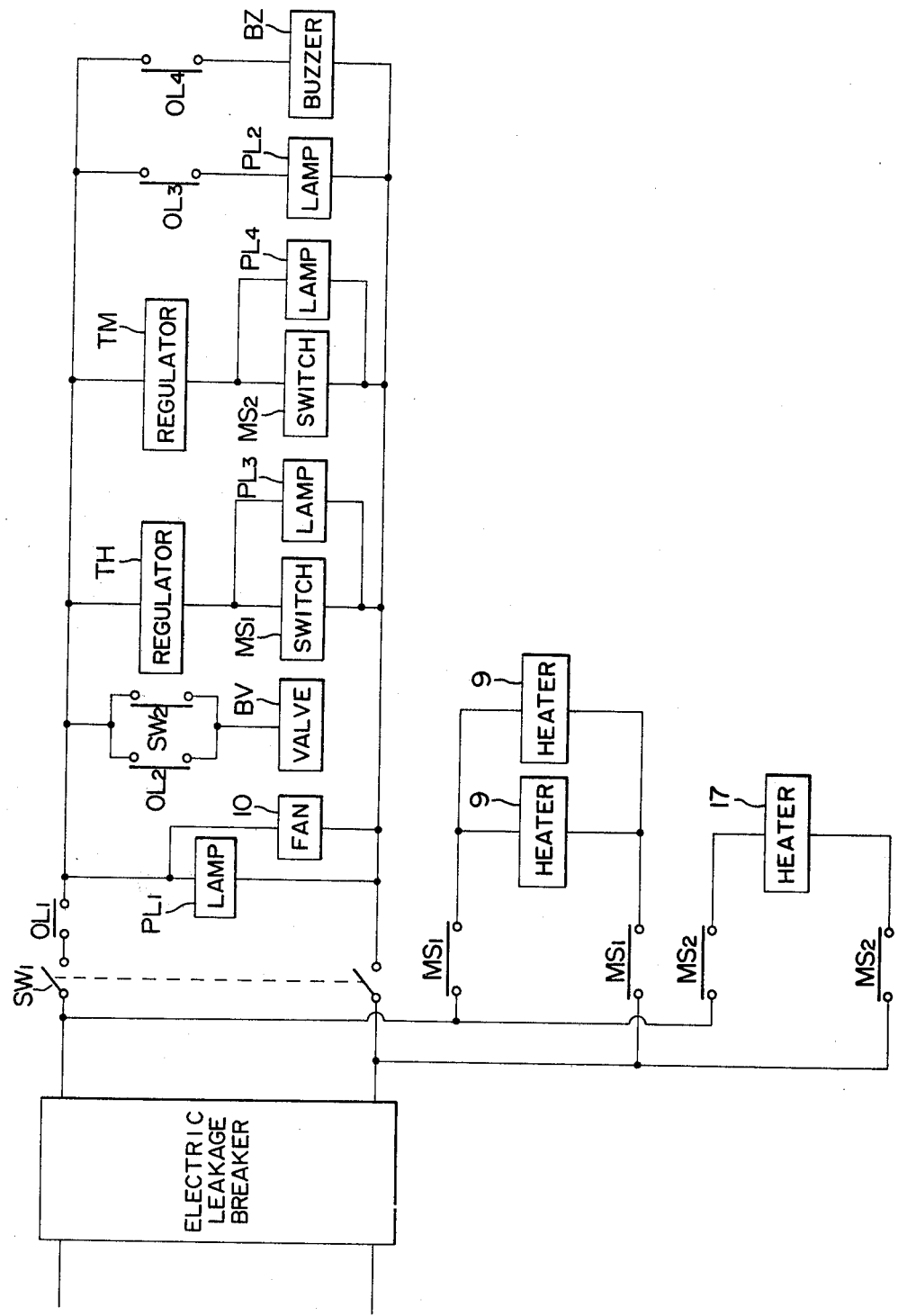
FIG. 5 is a wiring diagram of the embodiment.

Referring to FIG. 5, reference symbol $SW_1$ denotes a main switch, $SW_2$ a water supply return switch, $PL_1$ a main lamp, $PL_2$ a full-water display lamp, TH a temperature regulator, TM a humidity regulator, $MS_1$ a temperature control magnetic switch, $MS_2$ a humidity control magnetic switch, $PL_3$ a lamp for displaying an operation of an air-heating electric heater 9, $PL_4$ a lamp for displaying an operation of the electric heater 17, and BZ a buzzer.

Referring to FIG. 2, reference numeral 23 denotes a water pipe connected to the water supply pipe 21, an electromagnetic valve 24 being provided in the water pipe 23.

The operation of the embodiment will be described. First, processed foods to be stored, such as cooked rice, vegetable, fishes and meat, and broiled fishes are inserted into the storage chamber 1, and the doors 3 are closed to keep the storage chamber 1 sealed.

On the other hand, when the main switch $SW_1$ is pressed to feed water to the tank 19 through the water pipe 21, the water flows from the tank 19 into the steam generator 14 and tank 15 through the pipes 20, 16.

When the level of the water in the tank 15 has become higher than the switch $OL_1$, the switch $OL_1$ is closed. Consequently, the main lamp $PL_1$ is lit, and the fan 10 starts being rotated. As a result, the air in the storage chamber is sucked from the suction port 7 into the upper section of the air passage 6 to flow to right and left therein. The air then flows through both side sections of the air passage 6 to enter the lower section thereof to blow into the storage chamber 1 through the meshes of the ventilating net 8. The resulting air is circulated in the storage chamber 1.

On the other hand, when the level of the water in the steam generator 14 and tank 15 has become as high as the switch $OL_1$ as shown in FIG. 2, the switch $OL_1$ is closed, so that the valve BV is closed. Accordingly, the supplying of water to the tank 15 is automatically stopped, and the water in the steam generator 14 and tank 15 is kept in the condition shown in FIG. 2. When the level of the water in the tank 19 has thereafter become as high as the switch $OL_3$, it is closed to turn on the lamp $PL_2$, and the supplying of water to the tank 19 is stopped at the same time.

The temperature regulator TH is then set to a temperature in the range of regulation of 30°-80° C., or a temperature of around 65° C. as necessary, which has the sterilizing effect in addition to the heat-retaining effect. The humidity regulator TM is set to a humidity in the range of regulation of 30-70%, i.e. a humidity suitable for the kind and nature of the processed foods inserted in the storage chamber 1, for example, 50-55% in the case of cooked rice, around 60% in the case of other kinds of cooked foods, and around 40% in the case of broiled fishes. When the above-mentioned various kinds of foods are inserted at once in the storage chamber 1, the humidity is set to a percentage suitable therefor. When the temperature regulator TH and humidity regulator TM have been set in the above-described manner, the lamps $PL_3$, $PL_4$ are lit, and the switches $MS_1$, $MS_2$ are closed. Consequently, the electric heater 9 is turned on, and the air in the passage 6 is thereby heated, so that the temperature in the storage chamber 1 increases. In the meantime, the electric heater 17 is also turned on, and the water in the steam generator 14 is heated thereby. As a result, the water in the steam generator 14 is heated, and the steam thus generated is supplied from the discharge port 18 to the storage chamber 1, so that the humidity in the storage chamber 1 increases.

When the temperature in the storage chamber 1 has reached a predetermined level, the temperature is detected by the temperature sensor 11, so that the switch $MS_1$ is opened. Consequently, the air-heating operation of the electric heater 9 is stopped. When the temperature in the storage chamber 1 has then decreased a little, the temperature drop is detected by the temperature sensor 11, so that the switch $MS_1$ is closed. Consequently, an air-heating operation of the electric heater 9 is resumed. The above-described operations are repeated automatically to maintain the temperature of the air in the storage chamber 1 substantially at a predetermined level.

On the other hand, the humidity in the storage chamber 1 has reached a predetermined percentage, the humidity is detected by the humidity sensor 12, so that the switch $MS_2$ is opened. Consequently, the operation of the electric heater 17 for heating the water in the steam generator 14, and the supplying of steam from the discharge port 18 to the storage chamber 1 are stopped. When the humidity in the storage chamber has then decreased a little, it is detected by the humidity sensor 12, so that the switch $MS_2$ is closed. Consequently, an operation of the electric heater 17 for heating the water in the steam generator 14, and the supplying of steam from the discharge port 18 to the storage chamber 1 are resumed. The above-described operations are repeated automatically to maintain the humidity in the storage chamber 1 substantially at a predetermined percentage.

The results of experiments conducted with the temperature and humidity set in the previously-mentioned manner show the following. The cooked rice can be kept in good condition reliably for at least two days and nights with the taste and color thereof remaining unchanged. The cooked vegetables, fishes and meat can also be kept in an absolutely good condition for at least two days and nights. The broiled fishes can be kept in a good condition, i.e. in the condition, in which they were inserted in the storage chamber, for at least one day and night.

When the amounts of water in the steam generator 14 and tank 15 have decreased to a certain extent, the switch $OL_2$ is opened, and the valve BV is opened, so that the water is supplied from the tank 19 to the steam generator 14 and tank 15. When the levels of the water in the steam generator 14 and tank 15 have thereafter reached positions shown in FIG. 2, the switch $OL_1$ is closed, and the valve BV is closed, so that the supplying of water to the steam generator 14 and tank 15 is stopped. The above-described operations are repeated automatically to maintain the water in the steam generator 14 and tank 15 substantially in the condition shown in FIG. 2.

On the other hand, when the amount of water in the tank 19 has decreased to a level lower than the switch $OL_4$, the same switch $OL_4$ is closed, so that the buzzer BZ goes off to inform the operator of the shortage of water. In such a case, the water may be supplied to the tank 19 through the water supply pipe 21 until the lamp $PL_2$ has been lit.

If the amounts of water in the steam generator 14 and tank 15 should have decreased, so that the levels of the water therein become lower than the switch $OL_2$, the same switch $OL_2$ is opened. As a result, the electric current stops flowing to the storage device to cause the operation of the storage device as a whole to be stopped.

In the case where the water supply pipe 21 is connected to the water pipe 23 as shown in chain line in FIG. 2, the electromagnetic valve 24 is provided in the water pipe 23, and the valve 24 is inserted in the circuit of the switches $OL_3$, $OL_4$ in the electric circuit referred to previously. When the level of the water in the tank 19 has become as high as the switch $OL_3$, the same switch $OL_3$ is closed. Consequently, the valve 24 is closed, and the water stops being supplied to the tank 19. When the level of the water in the tank 19 has become lower than the switch $OL_4$, the same switch $OL_4$ is opened, and the valve 24 is opened, so that the water starts being supplied to the tank 19. The above operations are repeated automatically to maintain the amount of water in the tank 19 substantially in a constant level.

The double hinged doors 3 for the storage chamber 1 may be substituted by an air curtain. In such a storage device, processed foods can be freely inserted into and withdrawn from the storage chamber 1 as the storage chamber 1 is kept sealed with the air curtain, which thus works in the same manner as the doors 3.

Figure 6:
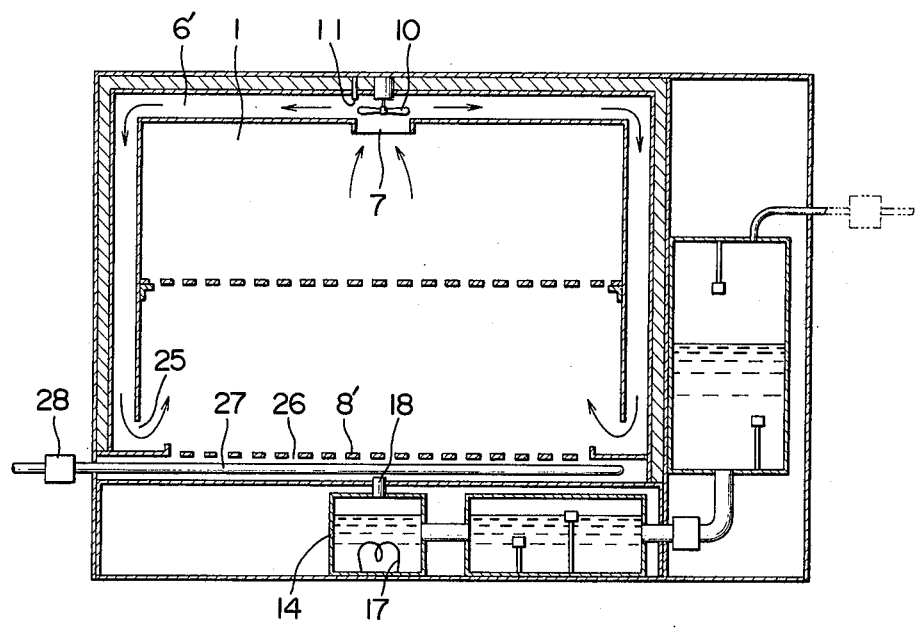
FIG. 6 is a front elevational view in longitudinal section of a second embodiment of a storage device for processed foods according to the present invention.

FIG. 6 shows a second embodiment of the present invention, in which a system for heating the air in the storage chamber 1 with steam is employed instead of the system, which is employed in the first embodiment, for heating the air in the storage chamber 1 with the electric heater 9. The construction of the second embodiment will be described with reference to the drawing. Reference numeral 6' denotes an air passage, which is provided with air discharge ports 25 at inner sides of lower ends of both side sections thereof, and 26 a heating chamber formed in a bottom portion of a storage chamber 1. An intermediate portion of an upper wall of the heating chamber 26 consists of a ventilating net 8'. The heating chamber 26 is provided therein with a pipe 27 for use in passing steam therethrough. The pipe 27 is provided at its base portion with an electromagnetic valve 28 instead of the electric heater 9 employed in the first embodiment. A base end of the pipe 27 is connected to a steam generator (not shown). The remaining reference numerals designate the same parts as are shown in FIGS. 1-5.

In the storage device having the above-described construction, the air in the storage chamber 1 flows also by the rotation of a fan 10 from a suction port 7 into the air passage 6'. The air thus entering the air passage 6' is divided into two, i.e. flows to right and left to blow into the storage chamber 1 from the air discharge ports 25 provided at the lower ends of both side sections of the air passage 6'. The air entering the storage chamber 1 is circulated therein. In the meantime, the air in the storage chamber 1 is heated with the steam flowing through the pipe 27. In addition, steam is supplied from a discharge port 18 to the storage chamber 1 in the same manner as in the first embodiment, so that the temperature and humidity therein increase.

When the temperature in the storage chamber 1 has reached a predetermined level, the temperature is detected by the temperature sensor 11, and a switch $MS_1$ is opened, so that the valve 28 is closed. Consequently, the steam being supplied to the pipe 27 stops, and the operation for heating the air in the storage chamber 1 is stopped. When the temperature in the storage chamber 1 has thereafter decreased a little, the temperature is detected by the temperature sensor 11, and the switch $MS_1$ is closed. As a result, the valve 28 is opened, and an operation for heating the air in the storage chamber 1 with the steam flowing through the pipe 27 is resumed. The above operations are repeated automatically to maintain the temperature in the storage chamber substantially at a predetermined level.

On the other hand, the humidity in the storage chamber 1 is also maintained substantially at a predetermined percentage in the same manner as in the first embodiment. Thus, the interior of the storage chamber 1 is kept at predetermined temperature and humidity.

The pipe 27 used in the second embodiment may be substituted by a gas burner unit having a pilot burner, which is set in the heating chamber 26, and which is provided with an electromagnetic valve 28 at a gas feed port thereof. When this gas burner unit is operated to heat the air in the storage chamber 1, the same effect as in the second embodiment can also be obtained.

When the temperature and humidity regulators in the storage device according to the present invention constructed as described above are operated arbitrarily to be set to predetermined levels, the temperature and humidity in the storage chamber can be regulated to desired levels independently of each other. Accordingly, when the temperature and humidity regulators are set in such a manner that the interior of the storage chamber can be maintained at such temperature and humidity that suit the kind and nature of the processed foods inserted in the storage chamber, such as cooked rice, vegetables, fishes and meat and broiled fishes, the foods can be kept in a just-processed condition for a long period of time without being spoiled and changed in quality and at temperatures and humidities, at which the foods were cooked or broiled in accordance with the kind and nature thereof.

When a small dining table with cooked or broiled foods placed thereon is inserted as it is in the storage chamber so as to be withdrawn therefrom at dinner time, the processed foods on the small dinner table can be kept hot and in a just-processed condition until the foods have been served. Therefore, a table, on which foods in a just-processed condition are placed, can be set before a customer speedily. Thus, this storage device is practically advantageous and simply and compactly made. Moreover, it can be manufactured easily and operated simply, and the condition of the air therein can be regulated finely and smoothly. The storage device according to the present invention can also be utilized to dry a coated product, which requires certain temperature and humidity in a drying step therefor, for example, a lacquered product.

What is claimed is:

1. A storage device for processed foods, comprising a sealed storage chamber formed in such a manner that processed foods can be inserted thereinto and withdrawn therefrom, said chamber having upper, lower and oppositely disposed side walls defined by an inner surface thereof, an air passage provided in said storage chamber so as to extend along intermediate portions of said upper, lower and two oppositely disposed side walls of said inner surface thereof and having a suction port and discharge port means at an upper section and a lower section thereof, respectively, to permit the air to be circulated in said storage chamber, said discharge port means being formed adjacent a ventilating net located above said lower wall of said chamber, a fan provided in said upper section of said air passage in which said suction port is located for directing air downwardly through two side sections of said air passage for discharge through said discharge port means, an air heater provided in said storage chamber, a steam generator having a steam discharge port which is opened into said storage chamber through said ventilating net, a temperature sensor and a humidity sensor provided in said storage chamber, an electric circuit having a temperature regulator responsive to said temperature sensor for controlling said air heater so as to regulate the temperature in said storage chamber to a predetermined level, and an electric circuit having a humidity regulator responsive to said humidity sensor for controlling said steam generator so as to regulate the humidity in said chamber to a predetermined level.

2. A storage device according to claim 1 wherein said discharge port means are located above said ventilating net.

3. A storage device according to claim 1 wherein said discharge port means are located below said ventilating net.

4. A storage device for processed foods according to claim 1 or 2 or 3, wherein the air heater is an electric heater.

5. A storage device for processing foods according to claim 1 or 2 or 3, wherein the air heater is a pipe connected to steam generator.

6. A storage device for processing foods according to claim 1 or 2 or 3, wherein the air heater is a gas burner unit.

* * * * *